United States Patent
Horn et al.

(10) Patent No.: US 9,819,810 B2
(45) Date of Patent: *Nov. 14, 2017

(54) METHOD AND SYSTEM FOR ENABLING USAGE OF MOBILE TELEPHONE SERVICES ON A DONOR DEVICE

(71) Applicant: Movirtu Limited, Slough (GB)

(72) Inventors: Chris Horn, Workingham (GB); Dingani Brian Nkala, Midrand (ZA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/213,178

(22) Filed: Jul. 18, 2016

(65) Prior Publication Data

US 2016/0330331 A1    Nov. 10, 2016

Related U.S. Application Data

(63) Continuation of application No. 14/500,942, filed on Sep. 29, 2014, now Pat. No. 9,398,458, which is a
(Continued)

(51) Int. Cl.
| | |
|---|---|
| *H04W 40/00* | (2009.01) |
| *H04M 15/00* | (2006.01) |
| *H04W 8/20* | (2009.01) |
| *H04L 29/06* | (2006.01) |
| *H04W 12/06* | (2009.01) |
| *H04W 4/24* | (2009.01) |
| *H04W 4/14* | (2009.01) |
| *H04W 12/12* | (2009.01) |
| *H04W 12/04* | (2009.01) |

(52) U.S. Cl.
CPC ........ *H04M 15/705* (2013.01); *H04L 63/083* (2013.01); *H04M 15/8221* (2013.01); *H04M 15/8278* (2013.01); *H04W 4/14* (2013.01); *H04W 4/24* (2013.01); *H04W 8/20* (2013.01); *H04W 12/06* (2013.01); *H04W 12/12* (2013.01); *H04W 12/04* (2013.01)

(58) Field of Classification Search
CPC .......... H04M 15/705; H04M 15/8278; H04M 15/8221; H04W 8/20; H04W 12/06; H04W 12/04; H04W 12/12; H04W 4/24; H04W 4/14; H04L 63/083
USPC ................ 455/445, 409, 410, 433, 463, 558
See application file for complete search history.

(56) References Cited

U.S. PATENT DOCUMENTS

| | | | |
|---|---|---|---|
| 6,778,828 B1 * | 8/2004 | Chander | ............... H04W 8/265 380/247 |
| 7,177,642 B2 * | 2/2007 | Sanchez Herrero | ....................... H04L 29/12188 455/433 |

(Continued)

*Primary Examiner* — Khai M Nguyen
(74) *Attorney, Agent, or Firm* — Donna Flores; Fleit Gibbons Gutman Bongini & Bianco P.L.

(57) ABSTRACT

A system and method can allow a first subscriber who is unable to use his mobile device due to theft, damage, loss, or any other reason to authenticate himself on a telecommunications network using a second subscriber's mobile device. The system and method can also allow the first subscriber to continue to make and receive calls and messages with the second subscriber's mobile device. Any charges incurred by usage of the second subscriber's mobile device by the first subscriber can be billed to an account associated with the first subscriber.

22 Claims, 10 Drawing Sheets

Related U.S. Application Data continuation of application No. 14/065,144, filed on Oct. 28, 2013, now Pat. No. 8,874,081, which is a continuation of application No. 13/295,856, filed on Nov. 14, 2011, now Pat. No. 8,571,564.

(56) References Cited

U.S. PATENT DOCUMENTS

| | | | | |
|---|---|---|---|---|
| 8,571,564 B2* | 10/2013 | Horn | ........................ | H04W 8/20 |
| | | | | 455/409 |
| 8,874,081 B2* | 10/2014 | Horn | ........................ | H04W 8/20 |
| | | | | 455/410 |
| 9,398,458 B2* | 7/2016 | Horn | ........................ | H04W 8/20 |
| 2004/0103289 A1* | 5/2004 | Akama | ................. | H04W 60/00 |
| | | | | 713/186 |
| 2004/0235514 A1* | 11/2004 | Bloch | ..................... | G06F 1/163 |
| | | | | 455/550.1 |

* cited by examiner

METHOD AND SYSTEM FOR ENABLING USAGE OF MOBILE TELEPHONE SERVICES ON A DONOR DEVICE

U.S. PATENT DOCUMENT REFERENCED

The present application is a continuation of U.S. patent application Ser. No. 14/500,942, filed Sep. 29, 2014; which is a continuation of U.S. patent application Ser. No. 14/065,144, filed Oct. 28, 2013, now U.S. Pat. No. 8,974,081; which is a continuation of U.S. patent application Ser. No. 13/295,856, filed Nov. 14, 2011, now U.S. Pat. No. 8,571,564, each of which is incorporated by reference in its entirety.

BACKGROUND

Mobile telephones and mobile communication devices in general have become an essential tool in many people's daily lives. Being without the use of a mobile device due to the device being broken, stolen, left at home or lost can be a distressing experience. Subscriber's wishing to get a replacement phone have to report their existing phone as lost/stolen to their network operator and then wait for a replacement phone to be delivered. This process can take anywhere from days to many weeks depending on the country, leaving the phone owner without the use of a phone until a replacement can be sought.

In order to alleviate the problem, some network operators offer backup and restore solutions that allow the data on the mobile phone to be stored in an offline location thereby preventing data loss. Other potential solutions try to alleviate the problem further. For example, Mahaffey teaches a system and method to locate a lost device and secure the lost data. However, these solutions have shortcomings. For instance, they do not allow the subscriber to use a temporary device while continuing to be billed on his own account and using his normal mobile number until a replacement device is obtained.

BRIEF SUMMARY

Disclosed is a system and method for enabling mobile telecommunications services such as making and receiving voice calls and sending and receiving text messages, multimedia messages and consuming mobile data services such as internet browsing on a donor device.

The system and method described herein can allow a subscriber who has lost their mobile device to use a second mobile device (e.g. a mobile device belonging to a friend or colleague) until a replacement device can be obtained or the original device can be restored to its owner. In one aspect, the account holder of the lost device, hereinafter referred to as a 'phone loser,' can access communication services on a second device, hereinafter referred to as a 'donor device,' on a temporary basis until a replacement device is found. The donor device may be owned by a friend or colleague, hereinafter referred to as a 'phone lender.'

The system and method can utilize a 'System Server' having software that can be integrated into a network operator's core network. In one aspect, the System Server can re-assign a MSISDN belonging to a phone loser to a donor device belonging to a phone lender.

In one example, a method for enabling a user to access a telecommunications network after their mobile device has been lost or stolen can include several steps. For example, the method can include receiving a reporting message at a system server in a telecommunications network indicating that a mobile device is lost or stolen. The method can include blocking the lost or stolen phone from accessing the telecommunications network, and the network can identify the lost or stolen phone based on an International Mobile Equipment Identity (IMEI) number associated with the lost or stolen phone. The method can include generating a secret key to enable the phone loser to access the telecommunications network and making the secret key accessible to the phone loser. The method can include receiving an authentication request at the system server from a donor device, and the authentication request can include the Mobile Station International Subscriber Directory Number (MSISDN) of the phone loser and the secret key. The method can include determining if authentication is successful by comparing the MSISDN and secret key from the authentication request to a stored MSISDN and a stored secret key that are stored in a database in the telecommunications network. The method can include allowing the phone loser to access the telecommunications network using the donor device after successful authentication.

In another example, a method for enabling a user to access a telecommunications network after their mobile device has been lost or stolen can include assigning the MSISDN of phone loser to the donor device and can include sending a first message from the system server to a Home Location Register (HLR) where the first message includes the MSISDN of the phone loser. The assigning method can also include sending a second message from the HLR to the system server, where the second message comprises the International Mobile Subscriber Identity (IMSI) of the phone loser. The assigning method can further include sending a third message from the system server to the HLR, where the third message identifies the system server as a virtual Visitor Location Register (VLR) for the phone loser.

In yet another example, a method for enabling a user to access a telecommunications network after their mobile device has been lost or stolen can include billing an account of the phone loser for charges incurred while accessing the telecommunications network using the donor device. The billing method can include receiving a first call request at a Mobile Switching Center (MSC), where the first call request comprises a prefix and a mobile number of a party-to-be-called, sending a second call request message from the MSC to the system server, wherein the second call request comprises a prefix and a mobile number of a party-to-be-called, and initiating billing of the account of the phone loser by the system server based on the prefix received in the second call request. A resulting call to the party-to-be-called can include the Calling Line Identity (CLI) of the phone loser.

In still another example, a method for enabling a user to access a telecommunications network after their mobile device has been lost or stolen can include retrieving a SMS message with the donor device, where the SMS message was intended for the phone loser and is stored in the system server. The method can include making the secret key accessible to the phone loser through email, internet, or an Interactive Voice Response (IVR) system. In addition, the reporting message received at a system server can include the IMEI number of the lost or stolen phone.

In another example, a method for routing a call to a shared mobile device in a telecommunications network can include receiving a call from a foreign network at a GMSC, where the call is intended for a phone borrower, and where the phone borrower is using a shared mobile device belonging to a phone lender. The method can include sending a first plurality of messages between a HLR and a System Server, where the HLR sends to the System Server an IMSI of the phone borrower and a second IMSI of the shared mobile device, and where the System Server sends to the HLR a MSISDN of the shared mobile device. The method can include sending a second plurality of message between the System Server and a VLR of the shared mobile device, where the System Server sends the IMSI of the phone borrower to the VLR of the shared mobile device, and where the VLR of the shared mobile device sends a MSRN of the shared mobile device to the System Server. The method can include sending a virtual MSRN to the GMSC, where the virtual MSRN is associated with the IMSI of the phone borrower and the MSISDN of the shared mobile device. The method can include sending a first message from the GMSC to a HLR, where the first message can include a MSISDN of the phone borrower. Sending a first plurality of messages can include sending a second message from the HLR to the System Server where the second message can include the IMSI of the phone borrower, sending a third message from the System Server to the HLR where the third message can include a MSISDN of the shared mobile device, and sending a fourth message from the HLR to the System Server where the fourth message can include an IMSI of the shared mobile device. Sending a second plurality of messages can include sending a fifth message from the System Server to the VLR of the shared mobile device where the fifth message can include the IMSI of the shared mobile device, and sending a sixth message from the VLR of the shared mobile device to the System Server where the sixth message can include a MSRN of the shared mobile device. Sending a virtual MSRN to the GMSC can include sending a seventh message from the System Server to the HLR where the seventh message can include the virtual MSRN, and sending an eighth message from the HLR to the GMSC where the eighth message can include the virtual MSRN. The method can include routing the call from the GMSC to the System Server, where the GMSC sends a first ISUP IAM to the System Server. The method can include sending a second ISUP IAM from the System Server to a MSC of the shared mobile device, sending a first ISUP ANM from the MSC of the shared mobile device to the System Server when the call is answered; and sending a second ISUP ANM from the System Server to the GMSC. The method can include initiating billing to the phone borrower for the call received on the shared mobile device.

DETAILED DESCRIPTION

Throughout this application, the terms 'mobile station', 'mobile device' and 'donor device' are used and may refer to any type of device capable of sending or receiving voice or data traffic over a GPRS, 3G, WIMAX, or LTE network, or their equivalents or evolutions. These terms can also refer to the devices conforming to the emerging Machine 2 Machine (M2M) specifications being developed by the European Telecommunications Standards Institute (ETSI).

The present application refers to specifications set out by the Third Generation Partnership Project (3GPP), which are publicly available and define the operation of mobile voice and data services within a telecommunications network.

In a GSM mobile network, the subscriber is identified by his unique International Mobile Subscriber Identity (IMSI). The IMSI is stored on the subscriber's SIM card which is typically transportable and able to be removed and re-inserted into other mobile devices. The subscriber's phone number is known as a Mobile Station International Subscriber Directory Number (MSISDN). The combination of SIM card and MSISDN is known as the "mobile station."

Subscription information containing IMSIs and MSISDNs are held in a database maintained by a network operator. The database is known as the Home Location Register (HLR).

Figure 1:
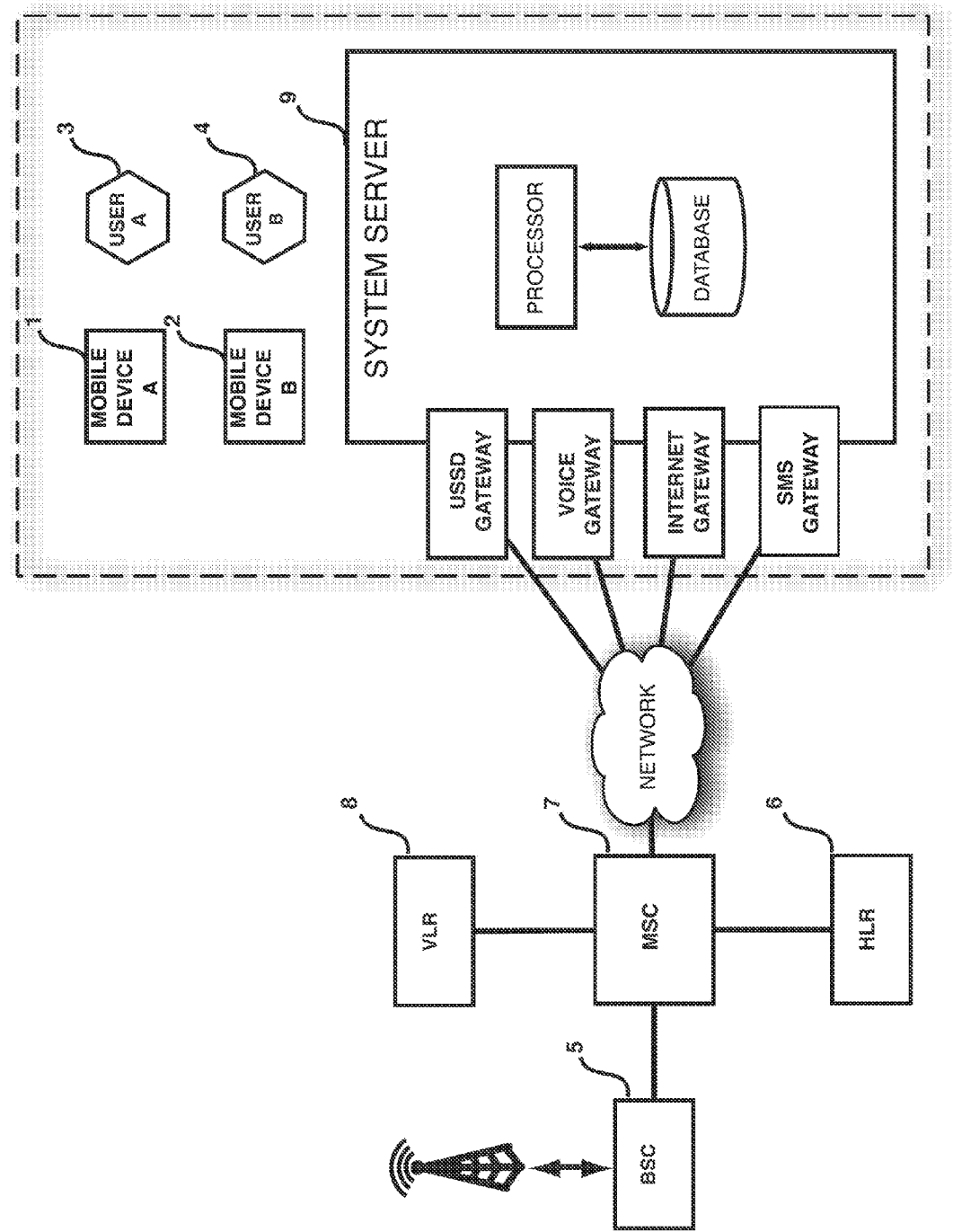
FIG. 1 shows an example of a telecommunications system.

FIG. 1 shows elements of a telecommunications system. The system can include a Mobile Device A 1 which is lost or stolen and a Mobile Device B 2 which is a donor device. User A 3 can be an owner of the lost/stolen device, and User B 4 can be an owner of the donor device. A Base Station Controller (BSC) 5 can be coupled to a Base Transceiver Station (BTS), which can provide connectivity to a radio network. The Home Location Register (HLR) 6 can be a principal subscriber database in the GSM network. The system can include at least one Mobile Switching Center (MSC) 7, which can perform switching functions within the network. The system can also include a Visitor Location Register (VLR) 8, which can be a database that holds temporary information about subscribers visiting the network. Software can be installed by the network operator on a server, hereinafter called a 'System Server' 9. The System Server 9 can handle business logic and can include at least one processor and at least one database.

1. Registration Procedure

Figure 2:
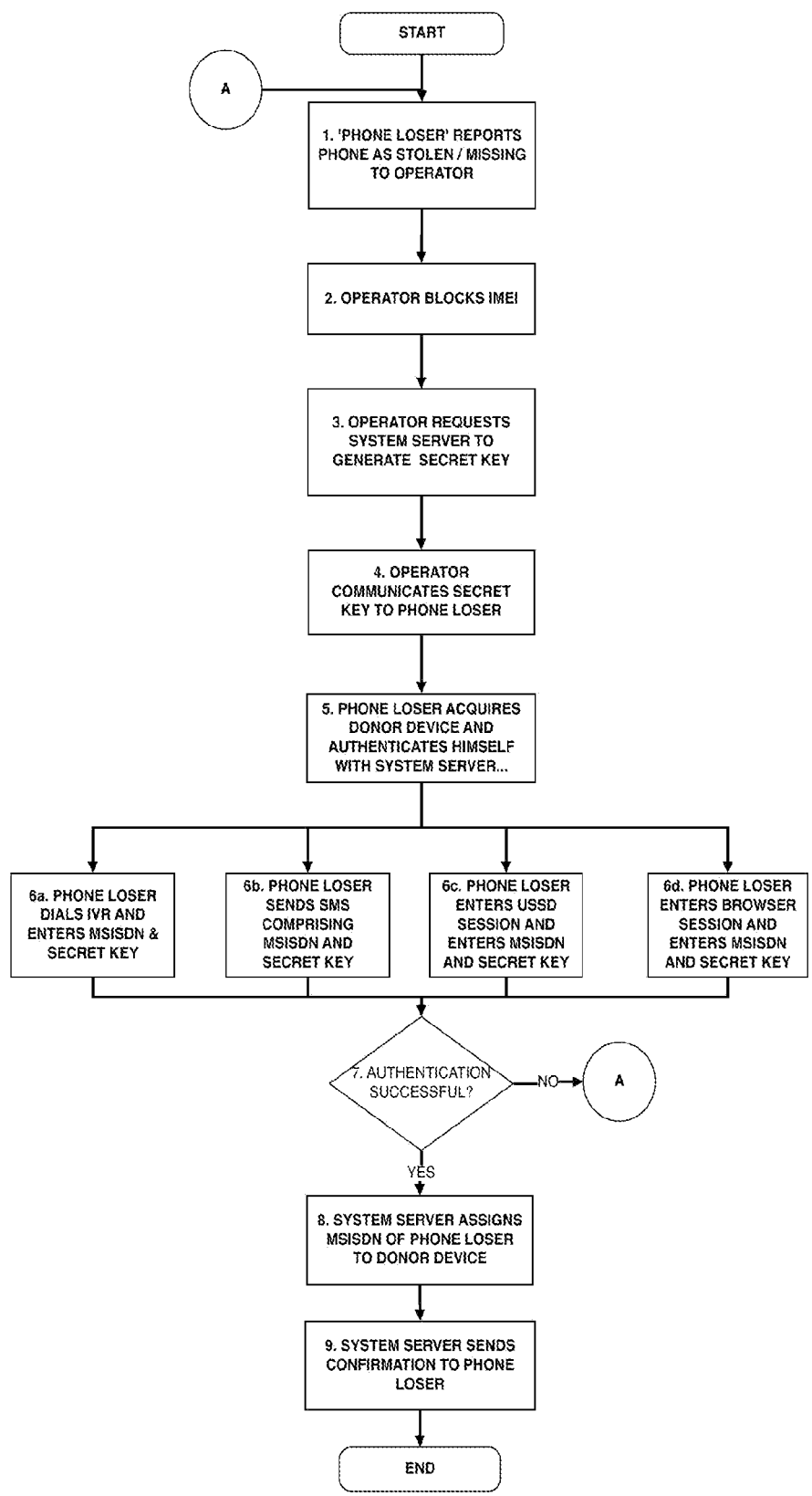
FIG. 2 shows an example of steps that can be taken to allow a user to access a telecommunications network after their mobile device has been lost or stolen.

FIG. 2 depicts an example of steps that can be taken to allow a user to access a telecommunications network after their mobile device has been lost or stolen. In a first step 1, the phone loser can report their mobile device as being lost or stolen to the network operator. Upon receiving notice of the lost or stolen mobile device, the network operator can black list the International Mobile Equipment Identity (IMEI) number of the lost mobile device 2, thereby restricting use of the lost or stolen mobile device on the telecommunications network. The black list can be stored in an Equipment Identity Register (EIR), which interfaces with the MSC. The network operator can also request the System Server to generate a 'secret key' for the phone loser for later authentication 3. The network operator can send the secret key to the phone loser 4 using any suitable method, such as email. Alternately, the secret key may be retrievably by the phone loser through a password-protected website on the internet, or other similar method. Once the phone loser has obtained the secret key, the phone loser can borrow a donor device and can authenticate himself with the network operator using any suitable method 5. The phone loser can authenticate himself through any suitable method by using the secret key 6. These methods can include calling an Interactive Voice Response (IVR) system and entering the phone loser's MSISDN and secret key 6*a*, sending a SMS message containing the MSISDN and secret key 6*b*, entering an Unstructured Supplementary Service Data (USSD) session and entering the MSISDN and secret key 6*c*, or entering a browser session and entering MSISDN and secret key 6*d*. The System Server can compare the MSISDN and secret key captured in the authentication process with a MSISDN and secret key held in a database and determine if authentication was successful 7. Upon successful authentication, the System Server can re-assign the phone loser's MSISDN to the donor device. The System Server can then confirm a successful reassignment, and can send a confirmation to the phone loser. The confirmation can be sent using any suitable method, such as SMS message, automated dialing machine, IVR system, USSD session, email or in printed form via postal service.

The 'secret key' referred to in step 3 of FIG. 2 can be any combination of randomly generated numbers or characters of any length. The precise form of the secret key is not important, but it is desirable that the secret key cannot be easily guessed. It is also desirable to transmit the secret key over a secure connection where eavesdropping is difficult. Step 8 of FIG. 2 now needs to be described in further detail.

Figure 3:
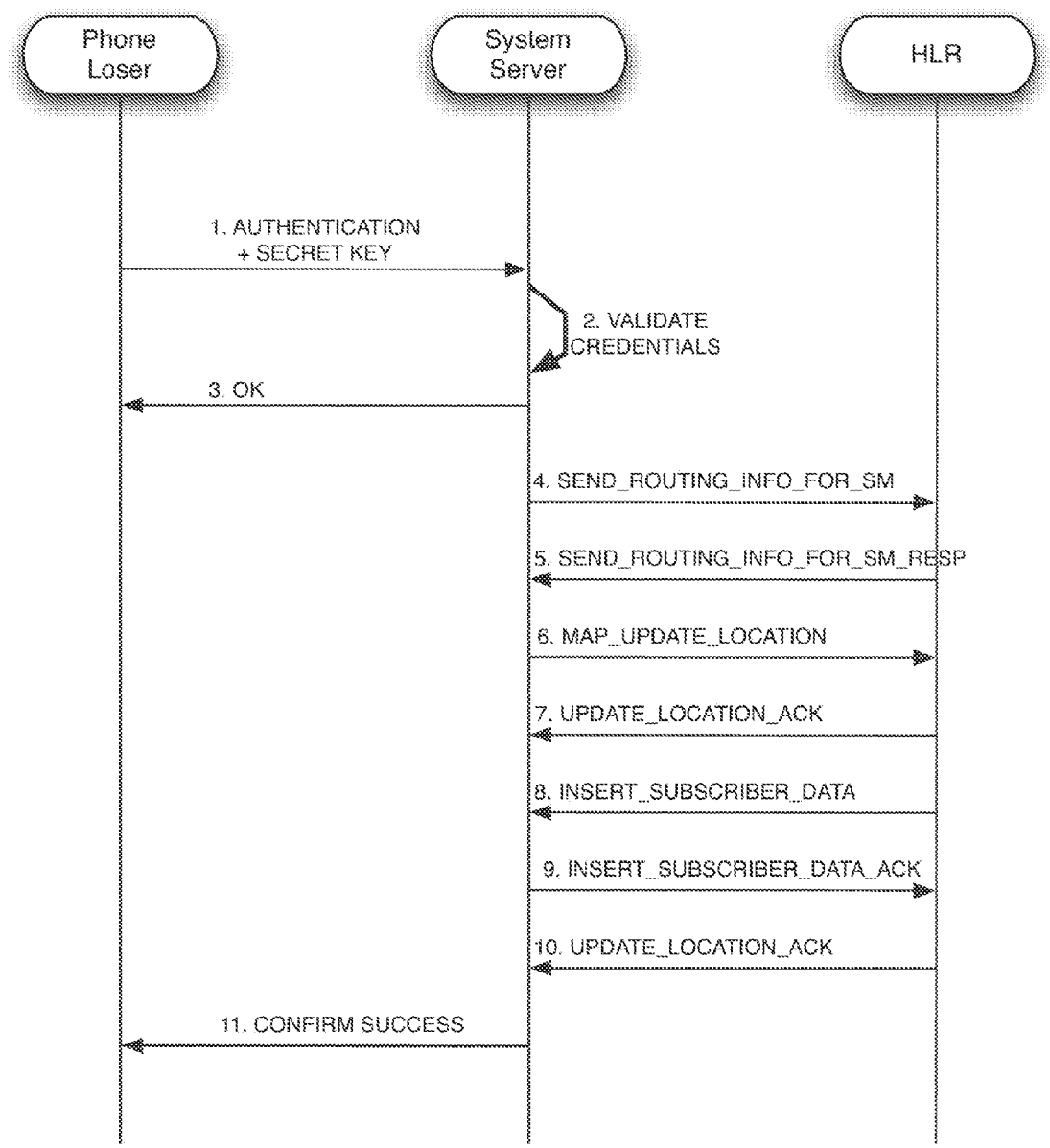
FIG. 3 is an example of a call flow diagram for an authentication process where a sequence of Mobile Application Part (MAP) messages are sent between a System Server and a network operator's equipment.

Reference is now made to FIG. 3, which shows an example of an authentication process. More specifically, FIG. 3 shows an example of a call flow diagram for an authentication process where a sequence of Mobile Application Part (MAP) messages are sent between the System Server and the network operator's equipment. In step 1, the phone loser authenticates himself with the System Server. An authentication request can include 'authentication credentials.' The authentication credentials can include the phone loser's MSISDN and a secret key. The authentication credentials can also include a MSISDN and/or an IMSI of the donor device. In step 2, the System Server can compare the authentication credentials received from the phone loser with values stored in a database, and if they match, authentication is successful. In step 4, upon successful authentication, the System Server can send a message, such as a MAP message, to the HLR specifying the MSISDN of the phone loser. In step 5, the HLR can respond by sending the IMSI of the phone loser to the System Server. In step 6, the System Server can imitate a VLR and can send a MAP Update Location message to the HLR. The MAP Update Location message can include the IMSI of the phone loser and can inform the HLR that the System Server is now acting as a virtual VLR for the phone loser. In step 7, the System Server can receive an Update Location Acknowledgement, and, in step 8, the System Server can receive a MAP Insert Subscriber Data operation from the HLR. In step 9, the System Server can send an acknowledgement back to the HLR, and, in step 10, the System Server can receive an Update Location acknowledgement from the HLR. If the Update Location acknowledgement is received by the System Server, the System Server can send a confirmation message to the phone loser. The System Server can store in its database at least the following information: the phone loser's MSISDN, phone loser's IMSI and donor device MSISDN.

In an alternative embodiment, steps 4 and 5 of FIG. 3 may be omitted (i.e. a Send_Routing_Info_for_SM message and the corresponding response). In this alternative embodiment, the System Server can obtain the phone loser's IMSI and MSISDN as part of an authentication and registration process described in steps 6*a* thru 6*d* of FIG. 2.

Having performed successful authentication and assignment of the phone loser's IMSI with the donor device, the phone loser is now able to make and receive calls and send and receive messages on the donor device.

2. Restoration of Phone Loser's Device

Figure 4:
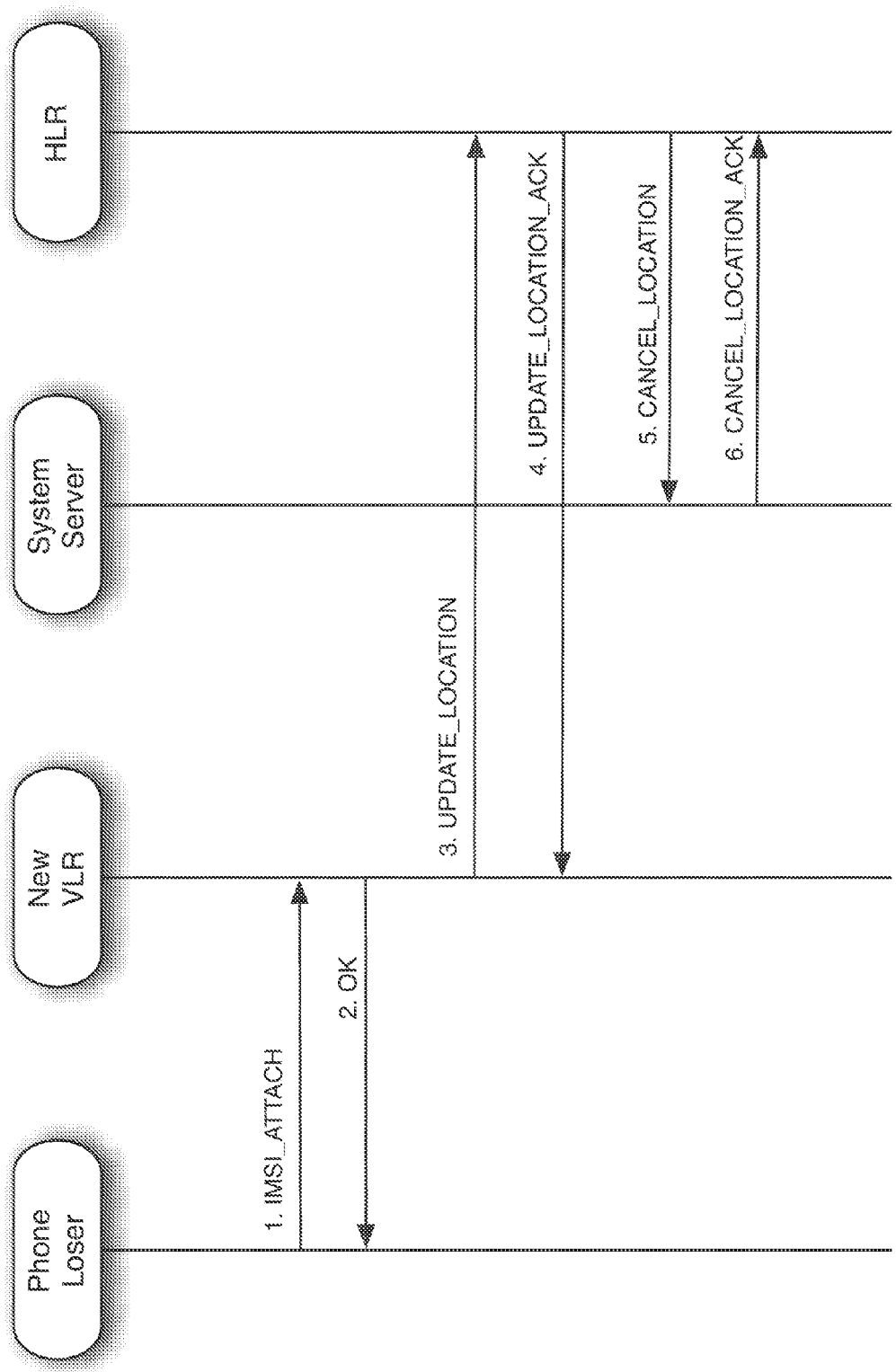
FIG. 4 is an example of a call flow diagram showing a sequence of MAP messages sent between systems in a case where a phone loser switches his replacement device on for the first time.

If the phone loser is unable to recover the lost or stolen mobile device, they may purchase a replacement mobile device. Once the phone loser is in possession of a replacement device and SIM card, it will be necessary for the phone loser to restore their ability to make and receive calls and messages to/from his original MSISDN on the replacement mobile device. Reference is made to FIG. 4. Upon switching on his replacement mobile device for the first time, as anyone skilled in the art will know, the mobile station will register with the network using a procedure known as "IMSI Attach." This procedure can include the VLR sending a MAP Update_Location message to the HLR. The HLR can then send an Update_Location acknowledgement to the VLR. The HLR can also send a Cancel_Location message to the System Server, and the System Server can respond by sending a Cancel_Location acknowledgment back to the HLR. At this point, the subscriber is able to use his replacement mobile device.

3. Example Scenarios

The following sections outline some example call scenarios. These scenarios are provided by way of example and not limitation.

3.1 Mobile Terminating Calls

Figure 5:
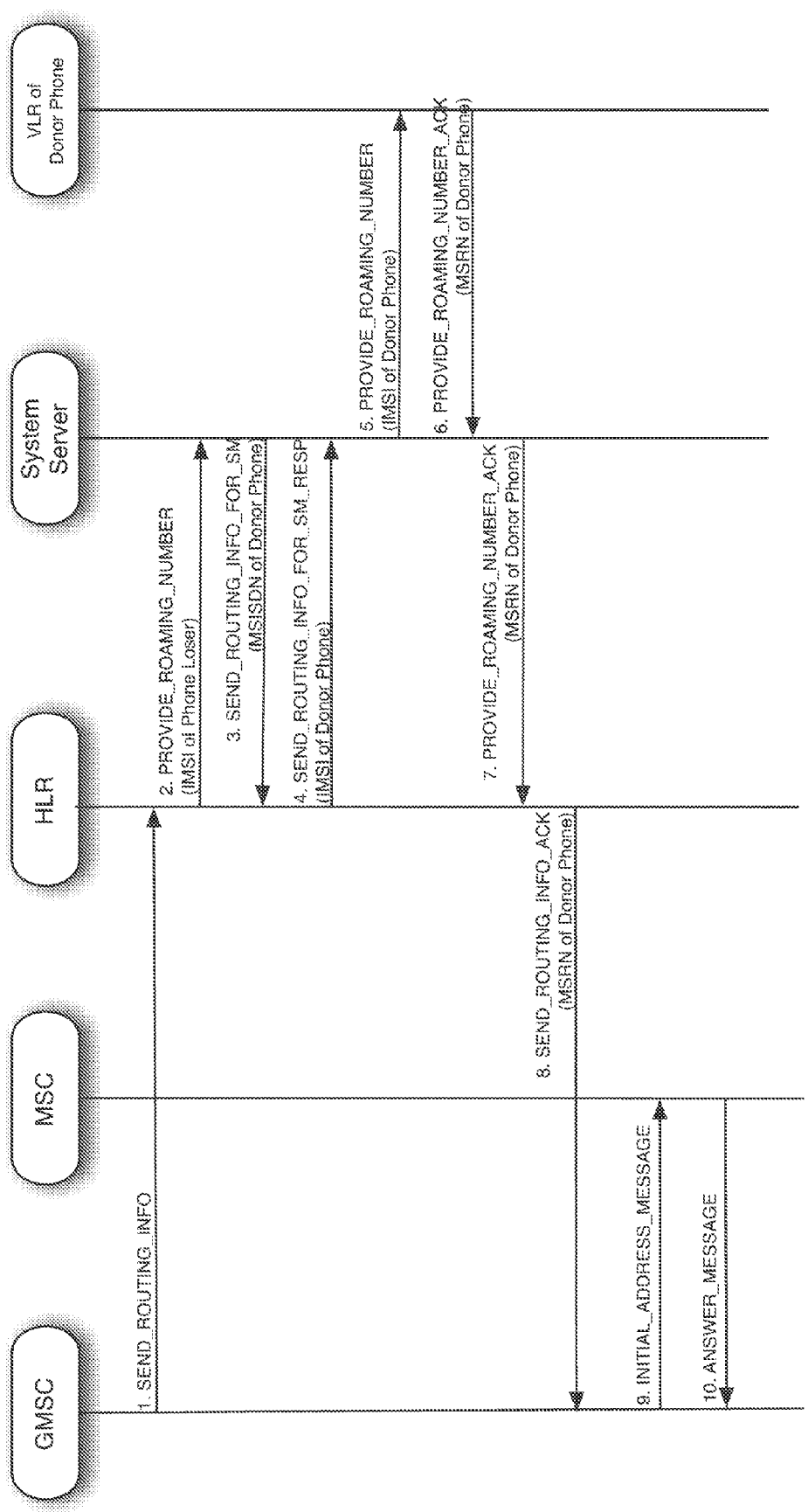
FIG. 5 is an example of a call flow diagram showing a sequence of MAP messages sent between systems in a case of a Mobile Terminating call arriving from a foreign network that is destined for the phone loser.

For mobile terminating calls, reference is made to FIG. 5, which shows an example sequence flow diagram of a call arriving from a foreign network via a Gateway MSC (GMSC). In this example, the call can be destined for the phone loser. In step 1, the GMSC can send a Send_Routing_Info message including the MSISDN of the phone loser to the HLR. In step 2, the HLR can send a Provide_Roaming_Number message, which can include the IMSI of the phone loser, to the System Server. In this example, the System Server can be registered in the HLR database as the VLR for the phone loser. Since calls should be routed to the donor device, the System Server can first query the HLR, as shown in step 3, by sending a Send_Routing_Info_for_SM message to obtain the VLR address of the donor device. In response, as shown in Step 4, the HLR can send a Send_Routing_Info_for_SM_Resp message to the System Server. Then, in step 5, the System Server can query the VLR of the donor device by sending a Provide Roaming Number message to the VLR of the donor device. In response, the VLR of the donor device can send a Provide_Roaming_Number acknowledgement to the System Server, as shown in step 6, which can include the Mobile Station Roaming Number (MSRN) of the donor device. In step 7, the System Server can send a Provide_Roaming_Number_Ack message to the HLR containing the MSRN. In step 8, the HLR can send a response to the prior Send_Routing_Info message received from the GMSC. In particular, the HLR can send a Send_Routing_Info_Ack message to the GMSC including the MSRN of the donor phone. This can cause the network to route the call to the donor device by sending an ISDN User Part (ISUP) Initial Address Message (IAM) using the MSRN of the donor device. In step 9, the GMSC can then perform the second leg of the call setup by sending the ISUP message IAM to the MSC. When the call is answered, the MSC can respond with the ISUP Answer_Message (ANM), and the call can be connected.

Figure 6:
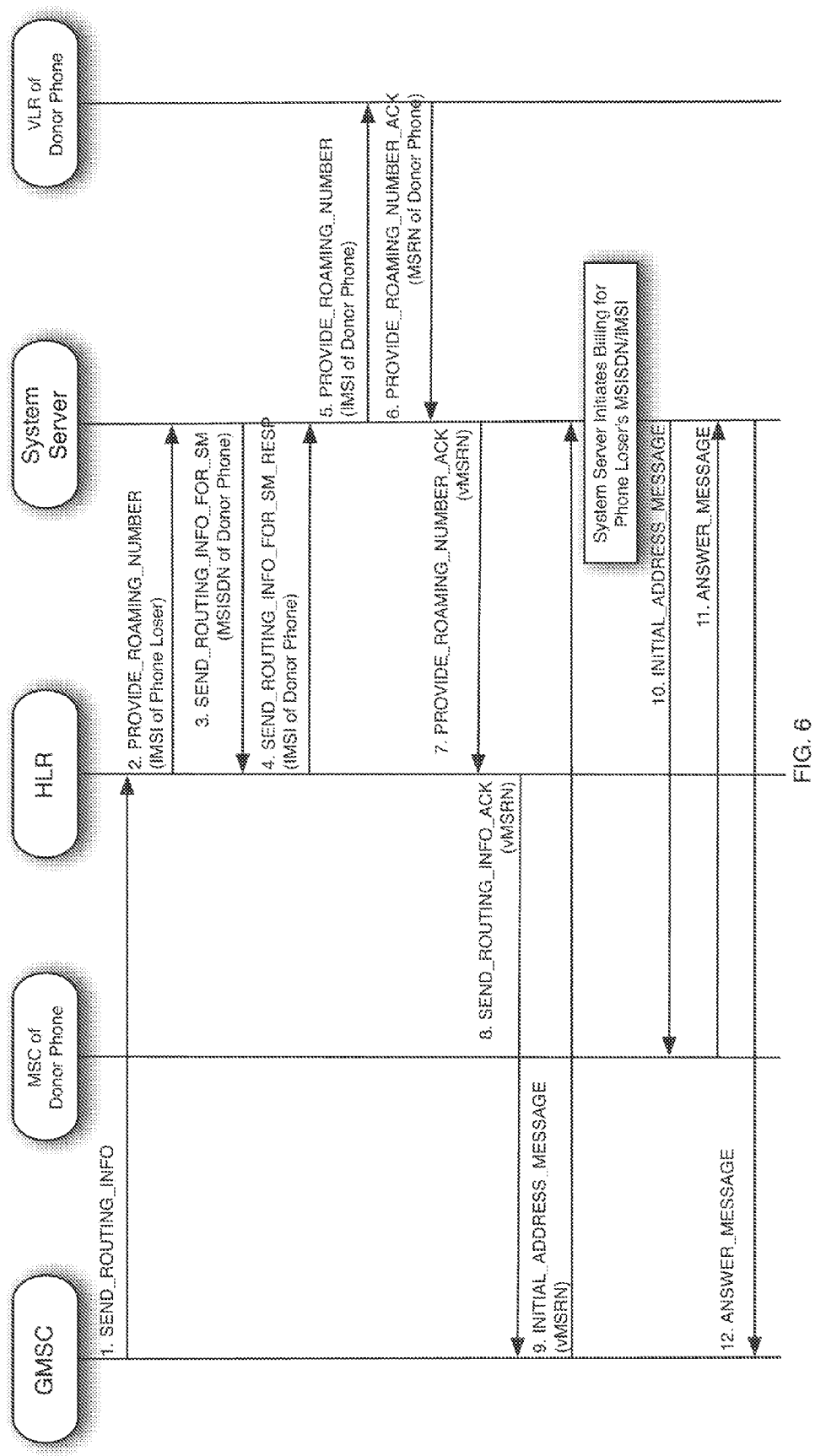
FIG. 6 is an example of a call flow diagram showing an alternative embodiment for a Mobile Terminating call procedure.

Reference is now made to FIG. 6, which shows an alternative embodiment of a Mobile Terminating call scenario. In step 1, the GMSC can send a Send_Routing_Info message to the HLR including the MSISDN of the phone loser. In step 2, the HLR can send a Provide_Roaming_Number message to the System Server, and the message can include the IMSI of the phone loser. The Provide_Roaming_Number message can be sent to the System Server, since the System Server is registered in the HLR database as the VLR for the phone loser. Since calls should be routed to the donor device, the System Server can first query the HLR, as shown in step 3, by sending a Send_Routing_Info_for_SM message to the HLR to obtain the VLR address of the donor device. The Send_Routing_Info_for_SM message can include the MSISDN of the donor phone. In response, in step 4, the HLR can send a Send_Routing_Info_For_SM_Resp message, which can include the IMSI of the donor phone, to the System Server. Then, in step 5, the System Server can query the VLR of the donor device by sending a Provide_Roaming_Number message to the VLR of the donor phone. The Provide_Roaming_Number message can include the IMSI of the donor phone. In response, in step 6, the VLR of the donor phone can send a Provide_Roaming_Number_Ack message to the System Server including the MSRN of the donor phone. In step 7, System Server can allocate a virtual MSRN (vMSRN) which can be associated with the IMSI of the phone loser as well as the MSISDN of the donor phone. The System Server can respond to the HLR by sending a Provide_Roaming_Number_Ack message, which can contain the vMSRN. In step 8, the HLR can send a response to the original Send_Routing_Info message by sending a Send_Routing_Info_Ack message to the GMSC. The Send_Routing_Info_Ack message can include the vMSRN of the donor phone. This can cause the network to route the call to the System Server; hence the System Server can receive an ISUP IAM, which can include an Initial_Address_Message containing the vMSRN in step 9. In response, the System Server can initiate billing for the phone loser's MSISDN and IMSI. In step 10, the System Server can initiate a second ISUP IAM to the MSC of the donor phone. When the call is answered, the MSC can send an ISUP ANM to the System Server in step 11. The System Server can then send a second ISUP ANM to the GMSC in step 12.

The method described herein can enable various forms of phone sharing. For example, a phone borrower can borrow a shared mobile device ("shared device") from a phone lender and gain access to a telecommunications network. The method for routing a call from a foreign network to the shared device, where the phone borrower is the intended recipient of the call, can be similar to the method shown in FIG. 6 and described above. Phone sharing can be desirable when the phone borrower has misplaced or forgotten their phone, when their battery is depleted, or when the phone borrower does not own a phone but has a mobile account (e.g the phone borrower has an assigned IMSI and a MSISDN).

The System Server can function as a virtual VLR in a telecommunications network, and can enable sharing of a mobile device between a phone borrower and a phone lender. When a call is placed to the phone borrower from a foreign network, the GMSC can send a Send_Routing_Info message to the HLR including the MSISDN of the phone borrower. Then, the HLR can send a Provide_Roaming_Number message to the System Server, and the message can include the IMSI of the phone borrower. The Provide_Roaming_Number message can be sent to the System Server, since the System Server is registered in the HLR database as the VLR for the phone borrower. Since calls should be routed to the shared device, the System Server can first query the HLR by sending a Send_Routing_Info_for_SM message to the HLR to obtain the VLR address of the shared device. The Send_Routing_Info_for_SM message can include the MSISDN of the shared device. In response, the HLR can send a Send_Routing_Info_For_SM_ Resp message, which can include the IMSI of the shared device, to the System Server. Then, the System Server can query the VLR of the shared device by sending a Provide_Roaming_Number message to the VLR of the shared device. The Provide_Roaming_Number message can include the IMSI of the shared device. In response, the VLR of the shared device can send a Provide_Roaming_Number_Ack message to the System Server including the MSRN of the shared device. The System Server can then allocate a virtual MSRN (vMSRN) which can be associated with the IMSI of the phone borrower as well as the MSISDN of the shared device. The System Server can respond to the HLR by sending a Provide_Roaming_Number_Ack message, which can contain the vMSRN. The HLR can send a response to the original Send_Routing_Info message by sending a Send_Routing_Info_Ack message to the GMSC. The Send_Routing_Info_Ack message can include the vMSRN of the shared device. This can cause the network to route the call to the System Server; hence the System Server can receive an ISUP IAM, which can include an Initial_Address_Message containing the vMSRN. In response, the System Server can initiate billing for the phone borrower's MSISDN and IMSI. The System Server can initiate a second ISUP IAM to the MSC of the shared device. When the call is answered, the MSC can send an ISUP ANM to the System Server. The System Server can then send a second ISUP ANM to the GMSC.

3.2 Mobile Originating Calls

Figure 7:
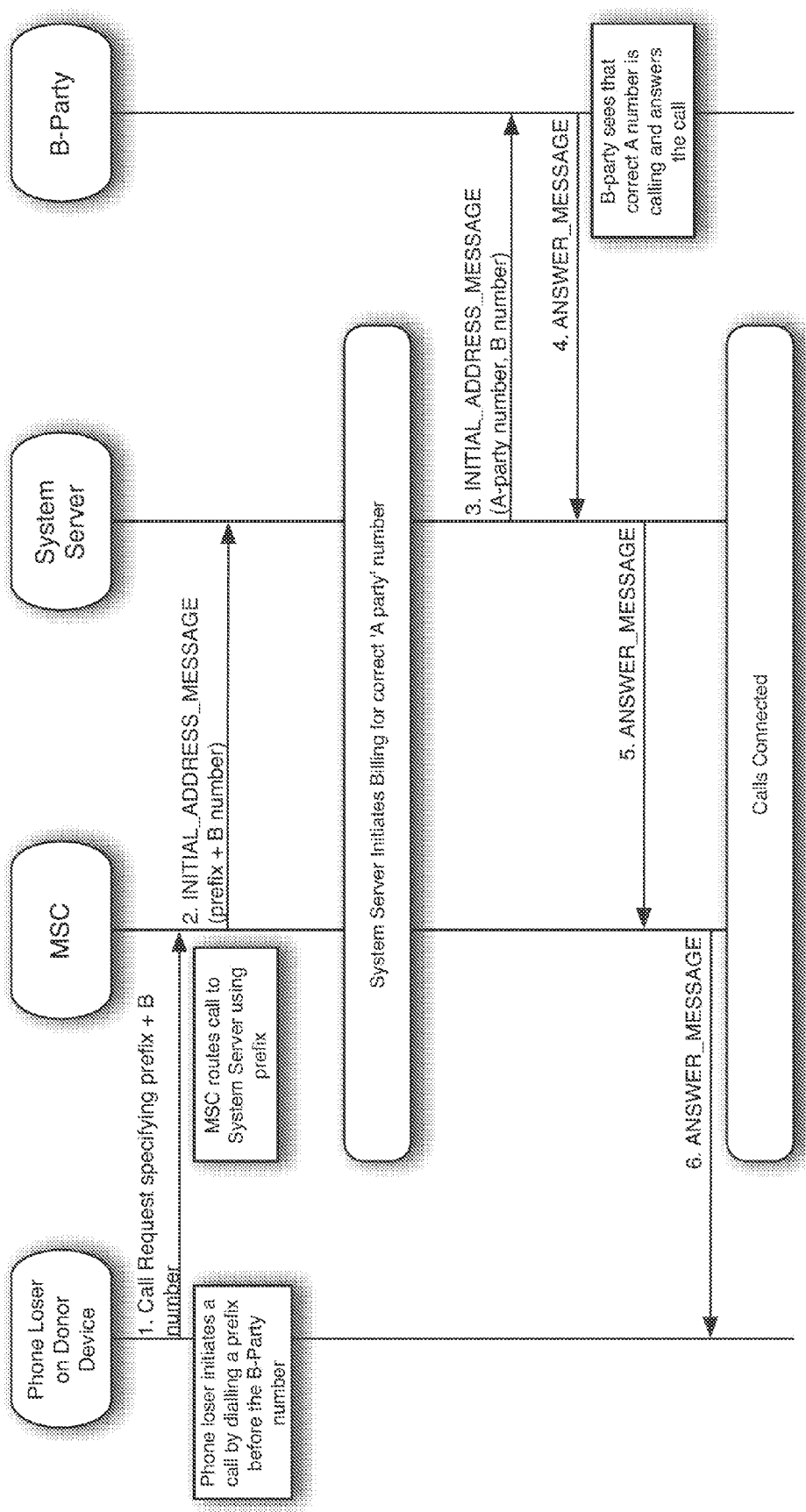
FIG. 7 is an example of a call flow diagram showing the sequence of MAP messages sent between the systems in the case of a Mobile Originating call originating from the phone loser using the donor device.

Reference is made to FIG. 7, which shows a call flow for mobile originating calls. Once the phone loser begins using the donor phone, the device is now shared by two MSISDNs. A mechanism is required to select the Calling Line Identity (CLI) to use for an originating call. Mobile Originated calls made by the phone lender can be made in a normal fashion and the network will use the correct CLI. On the other hand, a method is needed to differentiate a Mobile Originated call being made by the phone loser, as opposed to the phone lender. This method can include any suitable method. For example, the call can be prefixed with 1 or more digits. A prefix can prompt the network to route the call to the System Server that replaces the CLI with that of the phone loser before forwarding the call back to the MSC. By doing so, the recipient of the call will see the CLI of the phone loser, and not that of the phone lender.

In step 1 of FIG. 7, the phone loser can initiate a call by sending a Call Request to the MSC. The call request can include a prefix and a phone number of a party-to-be-called (e.g. prefix+'B' number, where 'B' number belongs to 'B-Party'). The MSC can route the call to the System Server based on the prefix. For example, the MSC can send a first Initial_Address message to the System Server in step 2, and the message can include a prefix in addition to the B number. Based on the Initial_Address message, the System Server can initiate billing to an 'A-Party' number, where the phone loser is the A-Party. The System Server can send a second Initial_Address message to the B-party in step 3. When the message arrives, the B-Party sees A-Party's CLI despite the call originating from a donor device owned by the phone lender. If B-Party answers the call from the phone loser, a first Answer_Message is sent to the System Server in step 4. In step 5, the System Server then sends a second Answer_Message to the MSC, which then sends a third Answer_Message to the donor device being used by the phone loser in step 6.

3.3 Mobile Terminating SMS

With regard to handling of Mobile Terminated SMS, at least two scenarios are possible. In Scenario 1, the messages can be delivered to the phone loser using the donor device. In Scenario 2, the Mobile Terminated messages can be stored by the System Server and kept for later delivery when, for example, the phone loser is in receipt of his original device or a replacement device.

3.3.1 Scenario 1

Figure 8:
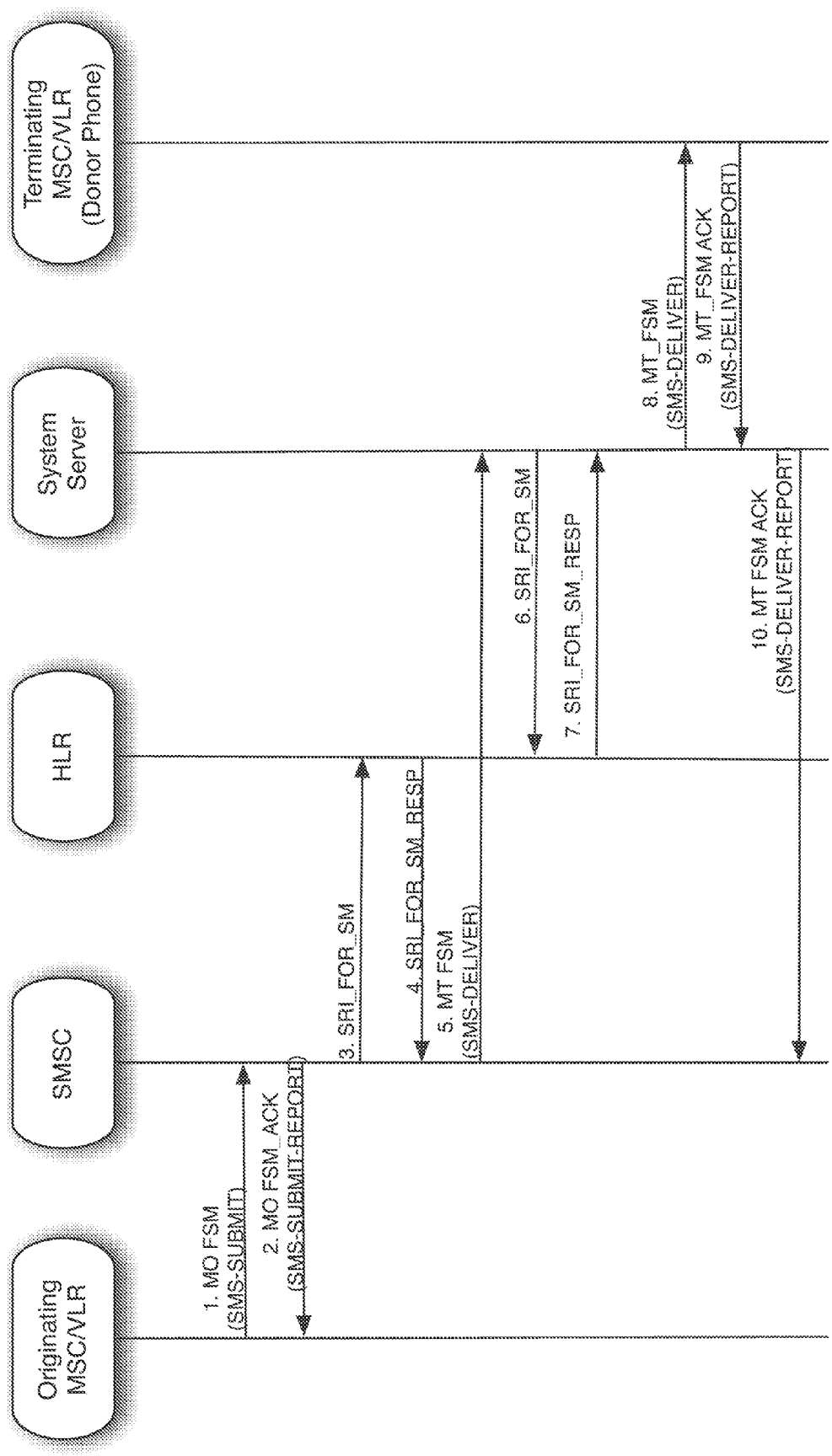
FIG. 8 is an example of a call flow diagram showing a sequence of MAP messages sent between systems in the case of Mobile Terminated SMS arriving at a donor device.

Reference is made to FIG. 8, which shows an example flow diagram of SMS messages being received on the donor device. In steps 1 and 2 of the example, the SMS is originated from a mobile device; however, the SMS can be originated from another other suitable source. In steps 3 to 5, the message can arrive at a short message service center (SMSC) for onward delivery. The SMSC can query the HLR to determine the VLR address of the terminating mobile subscriber. The HLR can respond with the VLR address corresponding to the System Server, thereby causing the SMSC to forward the message to the System Server. In steps 6 to 9, the System Server can query the HLR to determine the VLR address of the donor device and then forward the message to the donor device. In steps 9 and 10, upon successful delivery of the message, the System Server can inform the SMSC that the message has been delivered successfully.

3.3.2 Scenario 2

Figure 9:
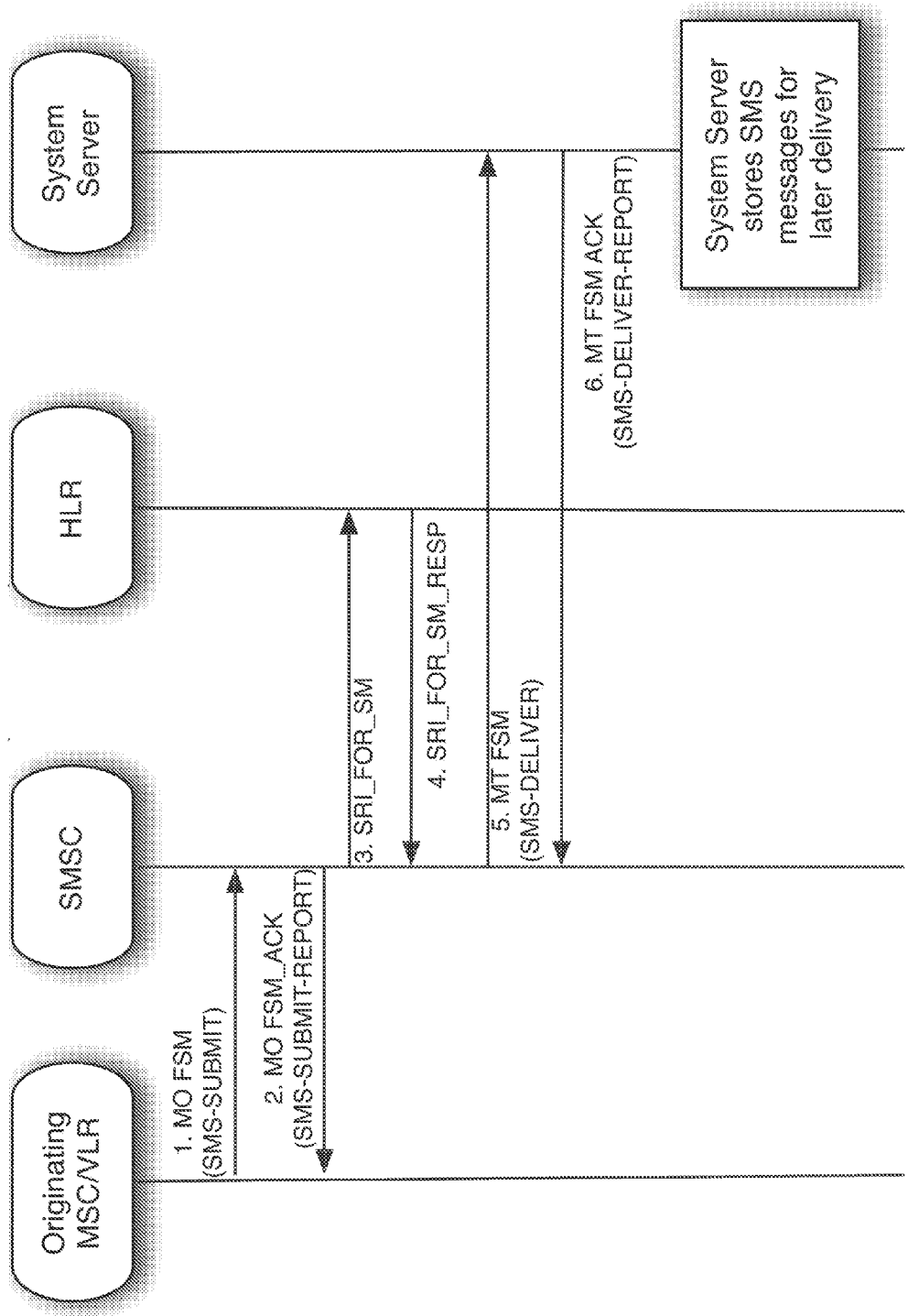
FIG. 9. is an example of a call flow diagram showing a scenario of mobile terminated SMS messages being stored by a System Server for later delivery FIG. 10. is an example of a call flow diagram showing a mobile originated SMS message being sent by a phone loser on a donor device using USSD as a bearer.

Reference is made to FIG. 9, which shows an example flow diagram for SMS messages being received on the donor device. In steps 1 and 2 of the example, the SMS is originated from a mobile device; however, the SMS can be originated from any other suitable source. In steps 3 to 5, the message can arrive in a SMSC for onward delivery. The SMSC can query the HLR to determine the VLR address of the terminating mobile subscriber. The HLR can respond with the VLR address corresponding to the System Server, thereby causing the SMSC to forward the message to the System Server. In step 6, the System Server can store the message for later delivery, deliver the message at a later time, and then send a delivery report message to the SMSC informing the SMSC that the message was delivered. Reference is now made again to FIG. 4, which shows the procedure invoked when the phone loser is in possession of a replacement phone. Step 5 shows the System Server receiving a Cancel_Location message from the HLR. Upon receipt of the Cancel_Location message, the System Server then knows that the phone loser is in possession of his replacement device. At this point, the SMS messages previously stored in step 6 of FIG. 9 can then be delivered by the System Server.

3.4 Mobile Originating SMS

With regard to handling of Mobile Originated SMS messages originating from the phone loser using the donor device, at least two scenarios are possible which are described in detail below. In Scenario 1, the phone lender originates an SMS message where the originating address of the message can correspond to the MSISDN of the phone lender. In Scenario 2, the phone loser originates a SMS message using the donor device, where the originating MSISDN can correspond to the MSISDN of the phone loser.

3.4.1 Scenario 1

Scenario 1 requires no special deviation from standard practice, since the normal default behavior will cause the desired result.

3.4.2 Scenario 2

Figure 10:
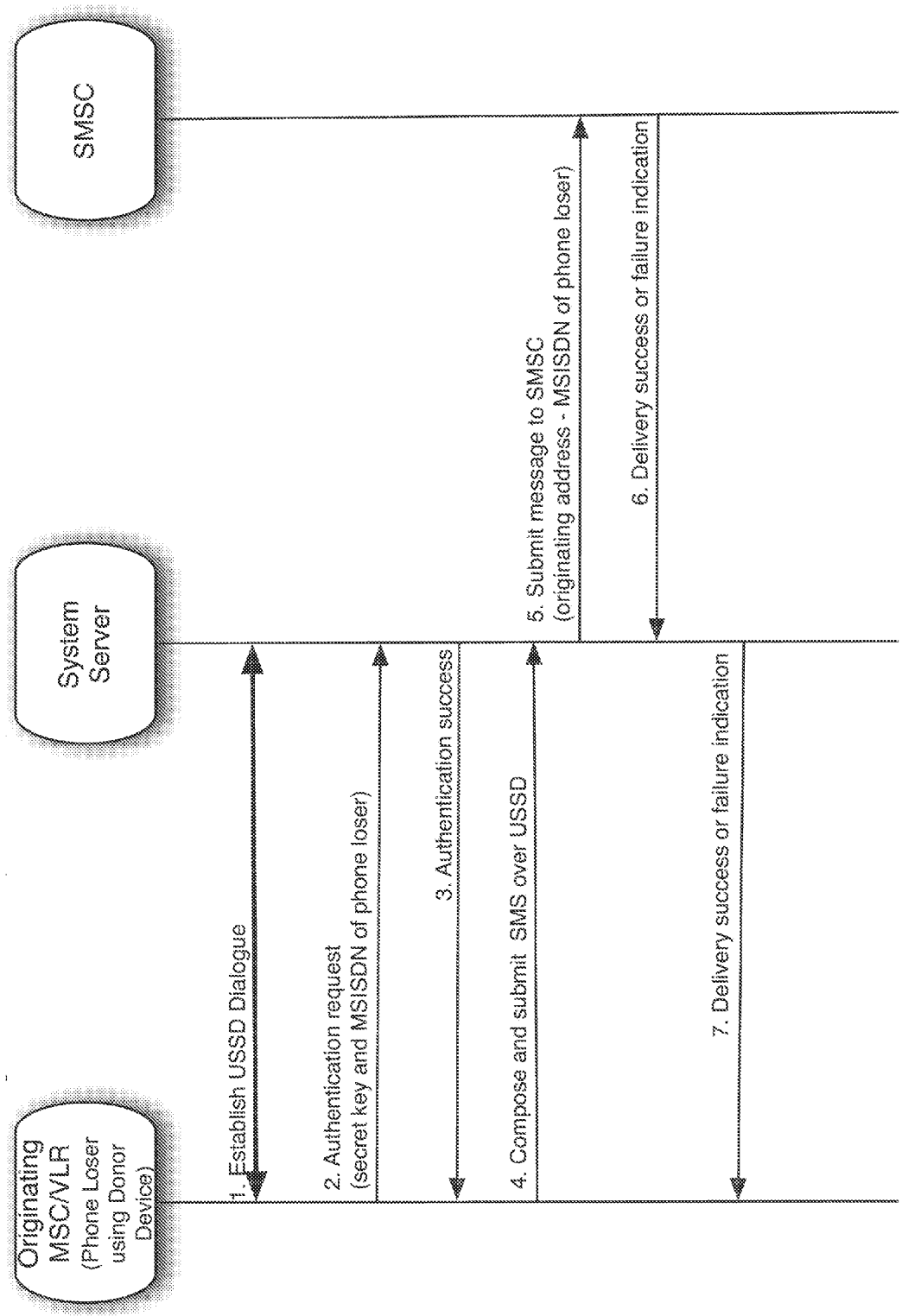

Reference is made to FIG. 10. In steps 1, 2 and 3, a USSD session is established between the phone loser and the System Server. The phone loser authenticates himself with the System Server using at least a secret key and MSISDN. In step 4, the phone loser composes and sends the SMS message within the USSD session. The System Server extracts the MSISDN from the authentication request sent from the donor device in step 2. If the authentication is successful, the System Server sends a message to the donor device indicating successful authentication in step 3. In step 4, a SMS is composed and submitted to the System Server over USSD. The System Server then extracts the message text entered by the user. In step 5, the System Server sends a new SMS message to the SMSC requesting a delivery report. The new message can include the MSISDN of the phone loser from Step 1 and the message text from Step 4. In Step 6, the System Server receives a first delivery report indicating message delivery success or failure ('delivery result') from the SMSC. In step 7, the System Server sends a second delivery report to the phone loser indicating the delivery result. The System Server can, for example, send the second delivery report using USSD, if the USSD session still exists. Alternately, the System Server can send the second delivery report via SMS or any other suitable method.

3.5 Billing

For the scenarios where the System Server is required to initiate communication services, such as those referenced in FIG. 6 and FIG. 7, it may be necessary, depending on the requirements of the network operator, for the System Server to interact with the network operator's billing system so that the phone loser may be charged correctly for using the communication services.

What is claimed is:

1. A method for providing communication services to a device loser via a donor device of a device lender, after a mobile device of the device loser is lost or stolen, the method comprising:
   authenticating the device loser, by the system server, using first authentication credentials of the device loser, the first authentication credentials comprising a first identifier associated with the device loser and a secret key previously acquired from the system server;
   making an association, by the system server, between the first authentication credentials of the device loser and second authentication credentials belonging to the device lender, using the donor device; and
   interacting with an operator's network, by the system server, such that the device loser may successfully utilize communication services on the donor device.

2. The method of claim 1, wherein the first identifier comprises one or more of a Mobile Subscriber Integrated Digital Network (MSISDN) number of the user and an International Mobile Subscriber Identity (IMSI) of the lost or stolen device.

3. The method of claim 1, further comprising:
charging communication services provided to the device loser via the donor device to a personal billing account, held with a mobile operator, of the device loser.

4. The method of claim 3, wherein the communication services comprise one or more of: voice calls, video calls, Unstructured Supplementary Service Data (USSD) messages sent or received, Short Message Service (SMS) messages sent or received, Multimedia Messaging Service (MMS) messages sent or received or Instant Messages sent or received.

5. The method of claim 1, further comprising the system server receiving Mobile Terminated SMS messages and storing said SMS messages for later delivery.

6. The method of claim 1, wherein the authenticating is performed using Interactive Voice Response.

7. The method of claim 1, wherein the authenticating is performed using Short Message Service (SMS).

8. The method of claim 1, wherein the authenticating is performed using Unstructured Supplementary Service Data (USSD).

9. The method of claim 1, wherein the authentication is performed using Wireless Application Protocol (WAP).

10. The method of claim 1, wherein the authenticating is performed using Hypertext Transfer Protocol (HTTP).

11. The method of claim 1, further comprising storing temporary information about subscribers visiting a telecommunications network in a system server.

12. A system server for providing communication services to a device loser via a donor device of a device lender, after a mobile device of the device loser is lost or stolen, the system server comprising:
a processor that:
authenticates the device loser using first authentication credentials of the device loser, the first authentication credentials comprising a first identifier associated with the device loser and a secret key previously acquired from the system server;
makes an association between the first authentication credentials of the device loser and second authentication credentials belonging to the device lender, using the donor device; and
a communication interface coupled to the processor that interacts with an operator's network such that the device loser may successfully utilize communication services on the donor device.

13. The system server of claim 12, wherein the first identifier comprises one or more of a Mobile Subscriber Integrated Digital Network (MSISDN) number of the user and an International Mobile Subscriber Identity (IMSI) of the lost or stolen device.

14. The system server of claim 12, wherein the processor further charges communication services provided to the device loser via the donor device to a personal billing account, held with a mobile operator, of the device loser.

15. The system server of claim 12, wherein the communication services comprise one or more of: voice calls, video calls, Unstructured Supplementary Service Data (USSD) messages sent or received, Short Message Service (SMS) messages sent or received, Multimedia Messaging Service (MMS) messages sent or received or Instant Messages sent or received.

16. The system server of claim 12, further comprising a memory wherein the communication interface further receives Mobile Terminated SMS messages and stores said SMS messages in memory for later delivery.

17. The system server of claim 12, wherein the authenticating is performed using Interactive Voice Response.

18. The system server of claim 12, wherein the authenticating is performed using Short Message Service (SMS).

19. The system server of claim 12, wherein the authenticating is performed using Unstructured Supplementary Service Data (USSD).

20. The system server of claim 12, wherein the authentication is performed using Wireless Application Protocol (WAP).

21. The system server of claim 12, wherein the authenticating is performed using Hypertext Transfer Protocol (HTTP).

22. A computer program product for providing communication services to a device loser via a donor device of a device lender, after a mobile device of the device loser is lost or stolen, the computer program product comprising:
a non-transitory storage medium readable by a processing circuit and storing instructions for execution by the processing circuit for performing a method comprising:
authenticating the device loser, by the system server, using first authentication credentials of the device loser, the first authentication credentials comprising a first identifier associated with the device loser and a secret key previously acquired from the system server;
making an association, by the system server, between the first authentication credentials of the device loser and second authentication credentials belonging to the device lender, using the donor device; and
interacting with an operator's network, by the system server, such that the device loser may successfully utilize communication services on the donor device.

* * * * *